US005564456A

United States Patent [19]

Kolpak et al.

[11] Patent Number: 5,564,456

[45] Date of Patent: Oct. 15, 1996

[54] METHOD FOR MITIGATING SLUGS IN A PIPELINE

[75] Inventors: Miroslav M. Kolpak, Dallas; Richard L. Payne, McKinney; Sophany Thach, Dallas, all of Tex.

[73] Assignee: Atlantic Richfield Company, Los Angeles, Calif.

[21] Appl. No.: 476,727

[22] Filed: Jun. 6, 1995

[51] Int. Cl.[6] .................... G05D 7/00

[52] U.S. Cl. .................... 137/13; 137/8

[58] Field of Search .................... 137/8, 13

[56] References Cited

U.S. PATENT DOCUMENTS 5,421,357 6/1995 Levalldis .................... 137/8 X

*Primary Examiner*—Gerald A. Michalsky

*Attorney, Agent, or Firm*—F. Lindsey Scott

[57] ABSTRACT

A method for mitigating slugs in pipelines carrying multiphase mixtures of gas and liquid by adding a quantity of a surfactant selected from the group consisting of ethoxylated alcohols, polyglycosides and alpha olefin sulfonates to the multiphase mixture in the pipeline. After addition of a quantity of surfactant, a determination is made as to whether the quantity of surfactant added is sufficient to mitigate the slugs, and thereafter adjusting the quantity of surfactant added to an amount sufficient to mitigate the slugs.

14 Claims, 1 Drawing Sheet

METHOD FOR MITIGATING SLUGS IN A PIPELINE

FIELD OF THE INVENTION

This invention relates to a method for eliminating slugs in pipelines carrying multiphase mixtures comprising gas and liquids.

BACKGROUND OF THE INVENTION

In many operations, particularly oil field operations, pipelines are used to transport multiphase mixtures. In oil fields, such pipelines may be used to transport gas, oil and water mixtures produced from individual oil wells to common gathering lines and to transport gas, oil and water mixtures recovered from a common gathering point to a treatment facility such as a separator or the like. In such instances, the multiphase mixtures frequently tend to separate during transportation to the pipeline so that there are intermittent slugs of liquid followed by slugs of gas and the like. The formation of such slugs in pipelines results in severe stress on the pipelines and erratic operation of the equipment into which the pipelines discharge. As a result, it has been necessary to over-design pipelines to withstand the vibrational stresses and other stresses imposed on the pipelines by the slugs and to over-design separators and other equipment to accommodate the presence of the slugs. Such lines are also susceptible to fatigue failure as a result of the vibrational and other stresses.

The stresses on the pipeline can result from forces generated at bends in the pipeline as well as other mechanical stresses imposed on the pipeline by the multiphase mixture. For instance, the force imposed on the pipeline at a bend can be generally characterized by the equation $$F=PQV$$

wherein F equals the force imposed upon an elbow of the pipe; P equals the density of the mixture; Q equals the volumetric flow rate; and V equals the stream velocity. Since the densities of gas and water or oil are radically different, it is clear that radically different forces are imposed on the pipeline elbow intermittently when slugs are present in the line. These intermittent forces impose stresses which result in fatigue failure, vibration, and the like which have resulted in increased maintenance and replacement requirements for pipelines used to transport multiphase mixtures and over-design of such pipelines in an attempt to reduce the increased maintenance and replacement requirements.

Accordingly, methods have been sought to control slugs in pipelines transporting multiphase mixtures.

SUMMARY OF THE INVENTION

According to the present invention, slugs in pipelines carrying multiphase fluid mixtures consisting of gas and liquid are mitigated by a method consisting essentially of adding a quantity of a surfactant selected from the group consisting of ethoxylated alcohols, polyglycosides and alpha olefin sulfonates to the fluid mixture in the pipeline.

After addition of a quantity of surfactant, a determination is made as to whether the quantity of surfactant added is sufficient to mitigate the slugs, and thereafter adjusting the quantity of surfactant added to an amount sufficient to mitigate the slugs.

DESCRIPTION OF PREFERRED EMBODIMENTS

Figure 1:
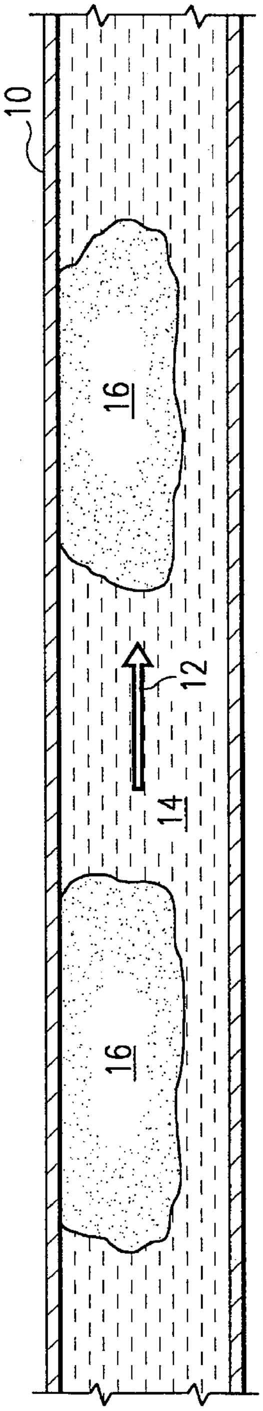
FIG. 1 shows slug flow in a pipe.

In the discussion of the Figures the same numbers will be used to refer to the same or similar components. Further pumps, valves and the like necessary to achieve the indicated flows have not been shown except as necessary for clarity.

According to the present invention, slug flow is mitigated by adding an effective quantity of a surfactant selected from the group consisting of ethoxylated alcohols, polyglycosides and alpha olefin sulfonates to the fluid mixture in the pipeline. The amount of surfactant added typically is at least about 25 ppm based upon the weight of liquid in the pipeline. Quantities greater than 25 ppm can be and desirably are used as necessary to control slugs in the pipeline.

While a variety of surfactants, such as alkylaryl sulfonates, alkyl sulfates, alkyl sulfonates, ethoxylated alkyl sulfonates, and the like can be used, it is preferred that a surfactant selected from the group consisting of ethoxylated alcohols, polyglycosides, and alpha olefin sulfonates be used. These materials are readily available commercially and have desirable properties for use in the present invention.

Many of the other surfactants referred to above, while they could be used, experience difficulties with hardness in water containing calcium and magnesium ions, are not readily tailored to be compatible with mixtures which are oil-rich or water-rich or are otherwise less desirable for use in the method of the present invention. The preferred surfactants are readily tailored to varied degrees of oil or water solubility which may be measured by the HLB index, which generally refers to the relative solubility of a particular surfactant in a hydrophobic or hydrophilic material. For instance, a surfactant with an HLB index of 12 would be quite water soluble. An HLB index of 10 would indicate a surfactant which is less water soluble, and a surfactant with an HLB index of 6 would be primarily oil soluble. Since in many applications of the present invention, the pipelines may be carrying primarily oil or primarily water in conjunction with gases, it is desirable that the surfactant used be readily tailored to fit the particular mixture of gas and liquids in the pipeline.

Alpha olefin sulfonates are preferred surfactants, particularly for water systems. They have less flexibility with respect to tailoring for particular oil/water systems than the ethoxylated alcohols, but do have a good temperature operating range; i.e., up to about 350° F., and they are less expensive than the ethoxylated alcohols.

The polyglycosides are preferred and are very flexible with respect to tailoring for specific oil/water systems, even when used in low concentrations. They are biodegradable and have a very low toxicity. Their operating temperature is generally considered to be less than about 200° F.

Of the preferred surfactants, the ethoxylated alcohols such as ethoxylated nonylphenol are preferred because of their commercial availability. They are also readily tailored to be soluble in oil or soluble in water. Because of their variable properties and their biodegradability plus their greater commercial availability, the ethoxylated alcohols are preferred. While all three of these surfactants are considered to be desirable surfactants for use in the process of the present invention, the ethoxylated alcohols are preferred.

By the practice of the present invention, slug flow such as shown in FIG. 1 is mitigated or eliminated. By addition of a suitable quantity of surfactant upstream from the section of the pipeline shown in FIG. 2, the slug flow of FIG. 1 is converted to stratified flow (FIG. 2) with the liquid flowing smoothly in a lower layer and gases flowing smoothly in an upper layer.

In FIG. 1, a pipe 10 containing a mixture of a gas 16 and a liquid 14 flowing in the direction shown by arrow 12 in slug flow is shown. This is representative of slug flow as it occurs in a pipeline without treatment by the method of the present invention.

Figure 2:
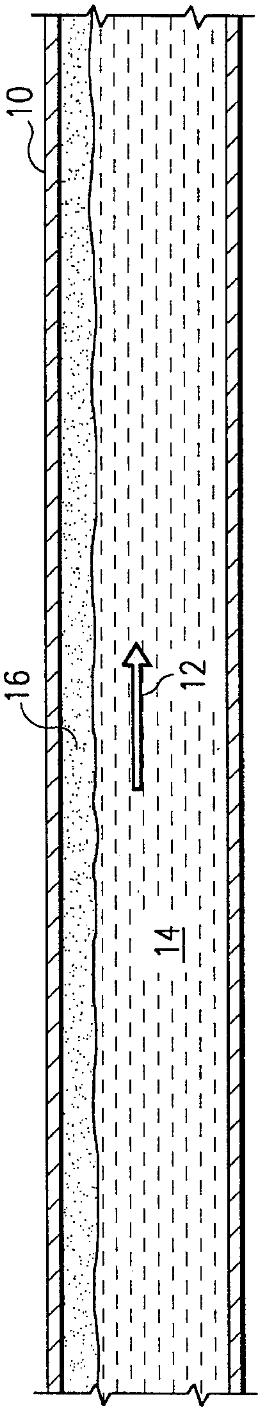
FIG. 2 shows a similar pipe after the surfactant addition of the present invention wherein stratified flow has been achieved.

In FIG. 2, a pipeline flowing the same gas/liquid mixture is shown after the addition of a surfactant according to the method of the present invention. The mixture is now flowing as a smooth stratum of liquid in the lower portion of the pipeline with the gas flowing above the liquid in the pipeline.

According to the method of the present invention, the surfactant is added upstream of the section of the pipeline to be protected. This addition can occur at a wellhead, at a common gathering station or other location as appropriate to control the formation of slugs. The desired amount of surfactant is added to the line to mitigate or eliminate slugs by converting the slug flow to stratified flow.

Figure 3:
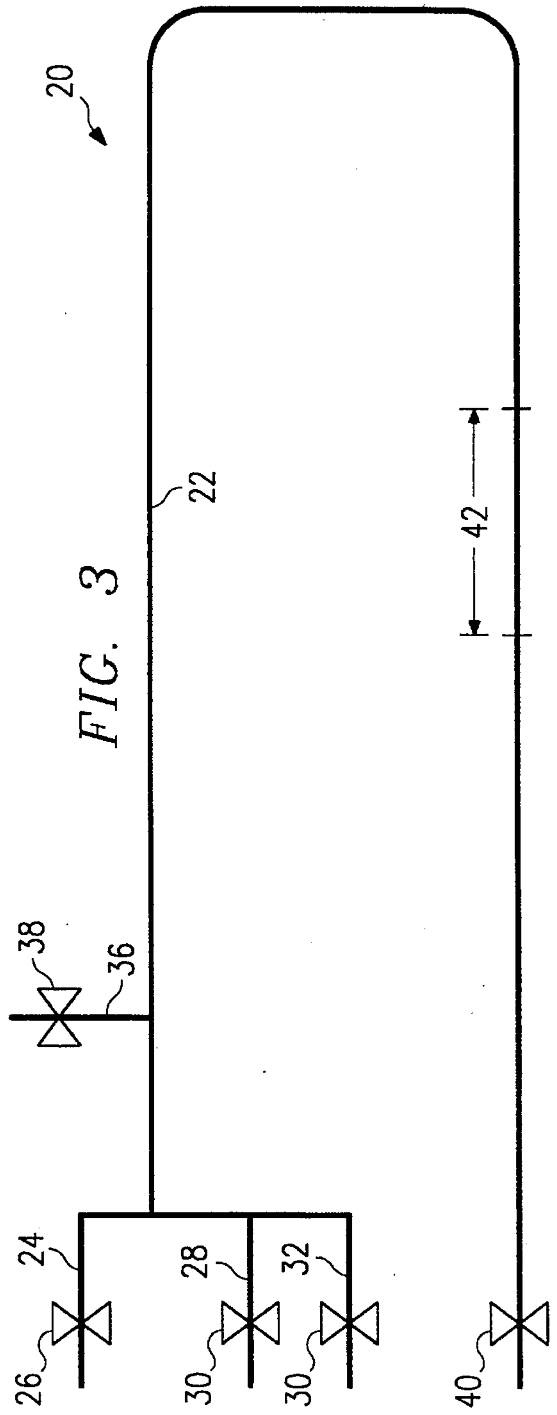
FIG. 3 shows a test loop useful for determining the amount of surfactant required in the practice of the present invention.

The determination of a proper amount of surfactant can be accomplished by use of a test loop as shown in FIG. 3. Test loop 20 comprises a length of pipe 22, which is equipped at its inlet end with a header which comprises a line 24 and a valve 26 for the addition of air into the pipe 22 either continuously or sporadically, a line 28 and a valve 30 for admitting water into pipe 22 and an oil line 32 and a valve 30 for admitting oil into pipe 22. These valves and lines permit the charging of substantially any desired mixture of gas and liquid to pipe 22. The liquid can be varied from all oil to all water or to mixtures of any proportions of oil and water. A line 36 and a valve 38 are provided for introducing a surfactant into pipe 22. Desirably valve 38 is a metering valve which is capable of metering surfactant into pipe 22 at a controlled rate. Further, it is desirable that pipe 22 contain at least a section 42 of its length which is constructed of glass or other suitable transparent material. The use of the transparent section 42 permits observation of the flow in the pipeline. The pipe 22 terminates at a valve 40 which is designed to control the back pressure on pipe 22 to control flow in pipe 22. Liquid and gas discharged from pipe 22 may be passed to recycle, to a further portion of test loop 20, discharged, or the like. By observation of the flow conditions in section 42 of pipe 22 and by observation of the smoothness of the flow (i.e., the absence of vibration and other evidence of the presence of slugs), it may be determined what quantity and type of surfactant should be added. When this determination has been completed, the addition of a proper amount and type of surfactant to field lines is readily accomplished.

In the event that no test loop is available or it is desired to immediately initiate surfactant injection into a pipeline to mitigate slugs, a quantity of surfactant may be selected and injected to mitigate slugs in the line, and thereafter a determination may be made as to whether the amount of surfactant injected has been sufficient. This determination may be based upon observation, if the system has facilities for such observations, or upon the absence of vibration or other evidence of slugs. If the amount of surfactant added is sufficient, it may be that the amount of surfactant being added is more than required to mitigate the slugs. In such instances, the amount of surfactant added may be gradually reduced until slugs are observed and then slightly increased to the minimum quantity necessary to mitigate the formation and presence of slugs in the pipe. If the slugs persist after surfactant addition is initiated, additional quantities of surfactant may be added incrementally until the amount of surfactant added is just sufficient to control the formation and presence of slugs in the pipe.

Clearly, different systems will have different tendencies toward the formation of slugs and will have different tolerances and requirements for the surfactants. The surfactants are desirably tailored to meet the particular system to the extent practical. In other words, in a pipe carrying primarily oil and gas, a surfactant should be selected which is soluble in oil. In a similar pipe carrying a mixture which is primarily water and gas, a surfactant should be chosen which is relatively water soluble. In pipelines carrying mixtures of oil and water, a surfactant having a limited solubility in each should be selected. These variables can be determined for each system in a test loop, such as described, or by other means known to those skilled in the art.

Typically, the surfactant will be used in a quantity greater than about 25 ppm based upon the weight of the liquid in the line. In many instances, amounts from 25 to 50 ppm will be found to be suitable. In other instances, it may be necessary to use added quantities of surfactant. The surfactant will be found primarily in the liquid component of the mixture of fluids transported; therefore, the compatibility of the surfactant with the liquid is a primary consideration.

Having thus described the invention by reference to its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, we claim:

1. A method for mitigating slugs in a pipeline carrying a multiphase fluid mixture comprising gas and liquid, said method consisting essentially of: adding a quantity of a surfactant selected from the group consisting of ethoxylated alcohols, polyglycosides and alpha olefin sulfonates to said fluid mixture in said pipeline.

2. The method of claim 1 wherein said quantity of said surfactant is at least about 25 ppm based upon the liquid in said pipeline.

3. The method of claim 2 wherein said surfactant is an alpha olefin sulfonate.

4. The method of claim 2 wherein said surfactant is a polyglycoside.

5. The method of claim 2 wherein said surfactant is an ethoxylated alcohol.

6. The method of claim 5 wherein said quantity is from about 25 to about 50 ppm based upon the liquid in said pipeline.

7. The method of claim 1 wherein said liquid comprises oil.

8. The method of claim 1 wherein said liquid comprises water.

9. The method of claim 1 wherein said liquid comprises a mixture of oil and water.

10. A method for mitigating slugs in a pipeline carrying a multiphase fluid mixture comprising gas and liquid, said method consisting essentially of:

a) adding a first quantity of a surfactant selected from the group consisting of ethoxylated alcohols, polyglycosides and alpha olefin sulfonates to said fluid mixture;

b) determining whether said first quantity of surfactant is sufficient to mitigate said slugs; and c) adjusting the quantity of surfactant added to an amount sufficient to mitigate said slugs.

11. The method of claim 10 wherein said first quantity of said surfactant is at least about 25 ppm based upon the liquid in said pipeline.

12. The method of claim 10 wherein said surfactant is an alpha olefin sulfonate.

13. The method of claim 10 wherein said surfactant is a polyglycoside.

14. The method of claim 10 wherein said surfactant is an ethoxylated alcohol.

* * * * *